United States Patent [19]

Schaub

[11] 4,456,992
[45] Jun. 26, 1984

[54] METHOD AND APPARATUS FOR ENHANCING THE PROBABILITY OF ERROR-FREE RECEPTION OF DIGITAL SIGNALS

[75] Inventor: Thomas Schaub, Thalwil, Switzerland

[73] Assignee: LGZ Landis & Gyr Zug AG, Zug, Switzerland

[21] Appl. No.: 315,632

[22] Filed: Oct. 28, 1981

[30] Foreign Application Priority Data

Nov. 4, 1980 [CH] Switzerland ............... 8177/80

[51] Int. Cl.³ .............................................. H04L 1/20
[52] U.S. Cl. ............................................ 371/6; 375/34
[58] Field of Search ............................. 371/6; 375/34

[56] References Cited

U.S. PATENT DOCUMENTS

| | | | |
|---|---|---|---|
| 3,214,700 | 10/1965 | Hook | 371/6 |
| 3,396,369 | 8/1968 | Brothman et al. | 371/6 |
| 3,449,716 | 6/1969 | Brothman et al. | 371/6 |
| 3,480,910 | 11/1969 | Brenza et al. | 371/6 |
| 3,523,278 | 8/1970 | Hinkel | 371/6 |
| 3,638,183 | 1/1972 | Progler et al. | 371/6 |
| 4,109,211 | 8/1978 | Mese et al. | 328/116 |
| 4,163,209 | 7/1979 | McRae | 371/6 |
| 4,224,689 | 9/1980 | Sundberg | 371/6 |
| 4,382,298 | 5/1983 | Evans | 371/6 |

*Primary Examiner*—Charles E. Atkinson
*Attorney, Agent, or Firm*—Ernest F. Marmorek

[57] ABSTRACT

In a method and an apparatus for enhancing the probability of substantially error-free reception of a signal including a sequence of discrete bits with the aid of a time-variable threshold value, and wherein each bit has a predetermined duration, and the threshold value may change during the bit duration, the steps include comparing at least a selected one of the received bits a multiple number of times with the threshold values, so as to establish the probable validity of the received bits in dependence of the comparison results.

18 Claims, 12 Drawing Figures

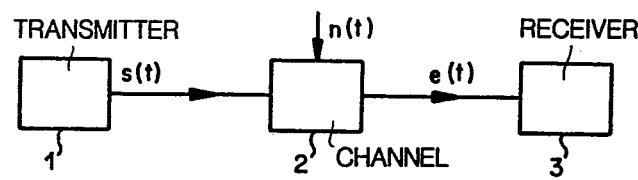
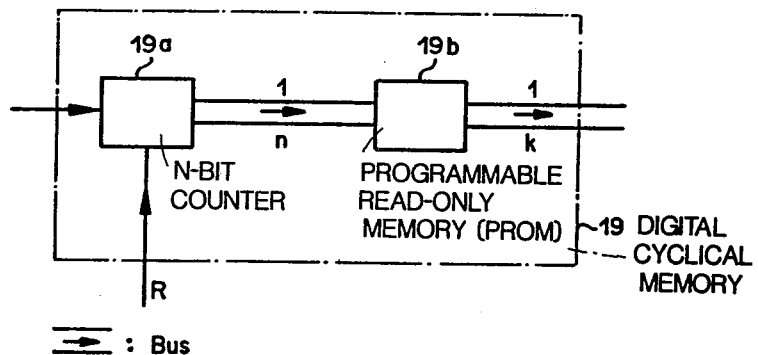
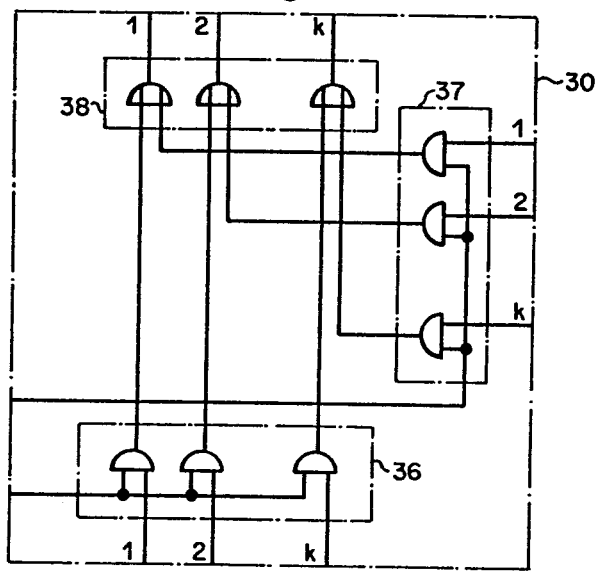

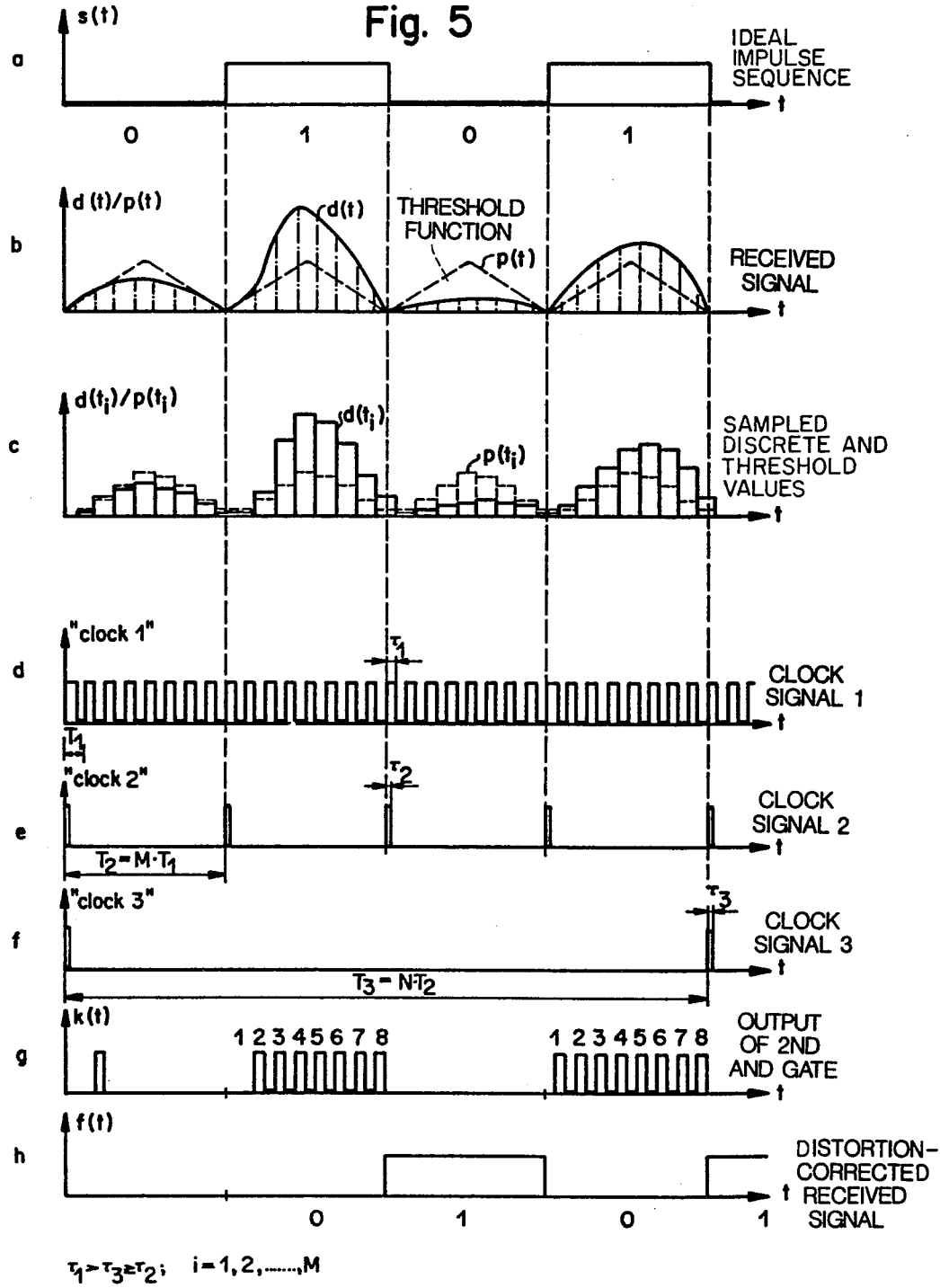

METHOD AND APPARATUS FOR ENHANCING THE PROBABILITY OF ERROR-FREE RECEPTION OF DIGITAL SIGNALS

BACKGROUND OF THE INVENTION

The invention relates to a method and an apparatus for enhancing the probability of substantially error-free reception of a signal consisting of a sequence of discrete bits with the aid of a threshold comparison. Digital signals, such as binary signals, are usually processed with the aid of a constant threshold value. If the received signal is equal or exceeds a given threshold value, then the received signal is assigned a logical value of "1". If the received signal is, however, smaller than the threshold value, then the received signal is assigned a value of a logical "0". If the received signal is contaminated as the result of interfering signals and distortions in the transmission channel, then the aforenoted method may lead to erroneous and impermissible results. To avoid such disadvantageous results, the received and deformed signal must be corrected for distortion. From Mese et al, U.S. Pat. No. 4,109,211 there is known a method of slow threshold adaption, which permits the receiver to make an automatic adjustment over a long period of time independent of any changes in the received signal, which are conditioned by slow changes of the transmission conditions of the channel.

SUMMARY OF THE INVENTION

It is an object of the present invention to devise a method and an apparatus for enhancing the probability of substantially error-free reception of a signal including a sequence of discrete bits with the aid of a time-variable threshold value, and wherein each bit has a predetermined duration, and the threshold value may change during the bit duration. The inventive steps include comparing at least a selected of the received bits a multiple number of times with a threshold value, so as to establish the probably validity of the received bits in dependence of the comparison results. The apparatus of the invention, as a result, removes some of the distortion obtained in a received signal and restores the received signal to an ideal rectangular form as is required for visual signals.

The invention makes advantageous use of known electronic modules, but without using any expensive filters, to adapt the front portion of the receiver to any non-ideal behavior of the transmission channel and to restore the signal as much as possible to its original shape, without being aware of the causes of such distortion, so that for subsequent processing classical means of digital techniques are applicable. It is a further advantage of this invention that the circuitry can be easily further supplemented to an extent that any slow changes in the transmission channel can automatically be taken into account. Contrary to the state of the art, only frequencies of occurrence, rather than average values, are obtained. It is a further advantage of the present invention that it is applicable to both analog circuits as well as to digital circuits.

Further objects and advantages of the invention will be set forth in part in the following specification, and in part will be obvious therefrom without being specifically referred to, the same being illustrated in the accompanying drawings and described in the Specification.

BRIEF DESCRIPTION OF THE DRAWINGS

For a fuller understanding of the nature and object of the invention, reference should be had to the following detailed description, taken in connection with the accompanying drawings in which:

FIG. 1 is a general schematic circuit of a transmission system;

FIG. 3 is a block schematic circuit of a first digital cyclical memory;

FIG. 4 is a block schematic circuit of a digital k-bit switch; and

FIGS. 5a through 5h show various signal waveforms.

DESCRIPTION OF THE PREFERRED EMBODIMENTS

Figure 2:
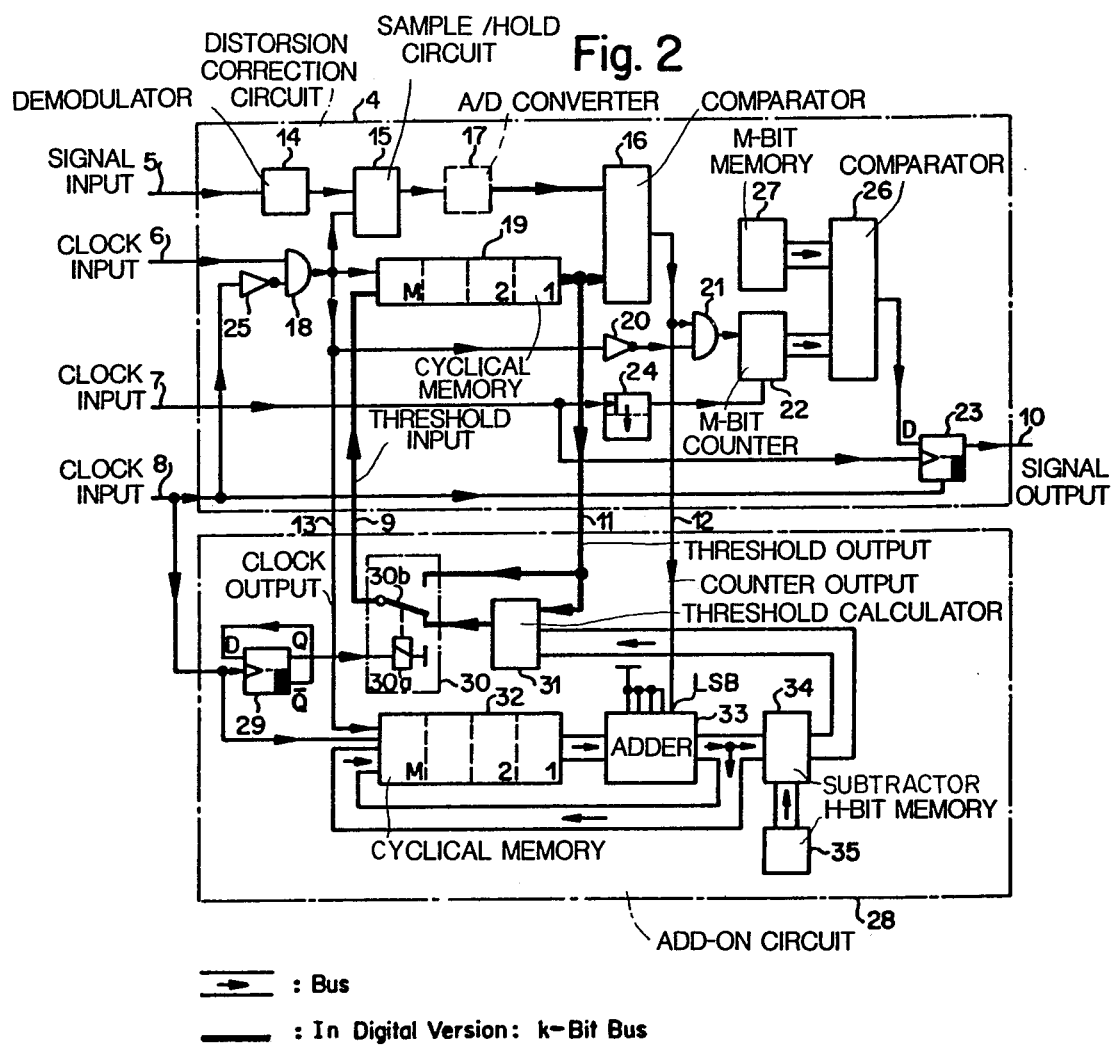
FIG. 2 is a block schematic of a circuit for correcting distortion in a received signal, including an add-on circuit.

Referring now to the drawing, the transmission system shown in FIG. 1 includes a transmitter 1, which is connected to a receiver 3 through a transmission channel 2.

The circuit 4 for correcting distortion shown in FIG. 2 includes a signal input 5, a first clock input 6, a second clock input 7, a third clock input 8, a threshold input 9, a signal output 10, a threshold output 11, a counter output 12, and a clock output 13. The following modules or terminals are connected to one another;

The signal input 5 is connected to the input of the demodulator 14, if the transmitted signal is modulated, otherwise with the sample input of an sample/hold circuit 15.

The output of the demodulator 14, if this latter is present, is connected to the sample input of the sample/hold circuit 15.

The output of the sample/hold circuit 15 is connected in the analog version of the invention with a first input of the first comparator 16, and in the digital version of the invention with the input of an analog/digital converter 17.

The first clock input 6 is connected to the first input of a first AND gate 18.

The output of the first AND gate 18 is connected to a control input of the sample/hold circuit 15, to the clock input of a first cyclical memory 19, to the input of a first inverter 20 and to the clock output 13.

The output of the first comparator 16 is connected to a first input of the second AND gate 21, and to the counter output 12.

The output of the first inverter 20 is connected with the second input of the second AND gate 21.

The output of the second AND gate 21 is connected with the clock input of an m-bit counter 22.

The second clock input 7 is connected with the clock input of a first D-flip flop 23 and the control input of a monostable multivibrator 24.

The third clock input 8 is connected with the input of a second inverter 25 and the reset input of the first D-flip flop 23.

The output of the second inverter 25 is connected with a second input of the first AND gate 18.

The output of the monostable multivibrator 24 is connected with the reset input of the m-bit counter 22.

The output of a digital second comparator 26 is connected with the D-input of the first D-flip flop 23.

The output of the first D-flip flop 23 is connected with the signal output 10.

Each m-bit bus connects the output of an m-bit memory 27 with a first m-bit input of the second comparator 26 and the output of the m-bit counter 22 with the second m-bit input of the second comparator 26.

In the analog version there are connected with a single lead, and in the digital version with a k-bit bus the following:

The output of the first cyclical memory 19 is connected to the second input of the first comparator 16 and the threshold output 11.

The threshold input 9 is connected with the serial data input of the first cyclical memory 19.

The output of the analog-to-digital converter 17, if present, is connected with the first input of the first comparator 16.

The threshold output 11 is connected with the threshold input 9, if an add-on circuit 28 is not utilized.

The add-on circuit 28 in FIG. 2 contains a second D-flip flop 29, a switch 30, which, for example, may consist of a switch-over relay, a threshold calculator 31, a second cyclical memory 32, an adder 33, a subtractor 34, and an h-bit memory 35.

A single lead connection is further present in the following units:

Between the third clock input 8, the clock input of the second D-flip flop 29 and the reset input of the second cyclical memory 32.

Between the $\overline{Q}$ output of the second D-flip flop 29 and its D input.

Between the Q output of the second D-flip flop 29, and a terminal of a relay coil 30a of the switch 30, while the other terminal of the relay coil 30a is connected to ground.

Between the clock output 13 and the clock input of the second cyclical memory 32.

Between the counter output 12 and the least significant bit input of a first h-bit input of the adder 33, while the remaining bit inputs of the first h-bit input are connected to ground. A h-bit bus connection exists:

Between the h-bit output of the second cyclical memory 32 and the second h-bit input of the adder 33.

Between the h-bit output of the adder 33 and the first h-bit input of the subtractor 34, as well as between the first one and the serial h-bit data input of the second cyclical memory 32.

Between the h-bit output of the h-bit memory 32 and the second h-bit input of the subtractor 34.

Between the h-bit output of the subtractor 34 and the h-bit first input of the threshold calculator 31.

In an analog version there are connected with one lead connection, and in the digital version with a k-bit bus the following units:

The threshold output 11 with the normally opened contact(s) of the switch 30, and with the second input of the threshold calculator 31.

The output of the threshold calculator 31 with the normally closed contact(s) of the switch 30.

The threshold input 9 with the switching arm(s) of the switch 30.

As has already been indicated, the circuit according to FIG. 2 can be implemented as an analog circuit, but also as a digital circuit. In the digital version the first comparator 16 is a digital comparator, and the first cyclical memory 19 a digital memory with k-bits per cell. Both cyclical memories 19 and 32 each have M cells and consist in the digital version preferably of respective k M-bit shift registers, whose clock inputs and whose reset inputs are respectively connected to one another. For the first cyclical memory 19 it is also possible to use a circuit according to FIG. 3. The switch 30 contains in the digital version k switch contacts 30b, in which case there is preferably used a digital switch according to FIG. 4, instead of a switch relay.

In the analog version the first comparator 16 is an analog comparator, and the first cyclical memory 19 an analog memory, for which it is advantageous to use a so-called charge coupled device shift register. The analog-to-digital converter 17 is omitted here and therefore shown in FIG. 2 dotted. The other modular elements, with the exception of the threshold calculator 31, are equal to those of the digital version. Instead of a switch relay it is also possible to use an analog semiconductor switch, for example, in CMOS technology, as switch 30. The digital first cyclical memory 19 shown in FIG. 3 consists of an n-bit counter 19a, which is connected through an n-bit bus with the address inputs of a programmable read-only-memory (PROM) 19b. The k-bit output of the programmable read-only memory 19b is simultaneously connected to the output of the first cyclical memory 19'. The n-bit counter 19a includes, in addition to the clock input already mentioned, when describing FIG. 2, which is connected to the output of the first AND-gate 18, an additional reset input R not shown in FIG. 2 which is connected to the output of the monostable multivibrator 24. The serial k-bit data input is not present here, however, and hence there does not exist any threshold input 9 either. Consequently a threshold output 11 is also absent or unnecessary.

The distortion correction circuit 4 cannot in this case be supplemented by means of an add-on circuit 28. To avoid this disadvantage, the programmable read-only-memory 19b must be replaced by a random access memory (RAM.)

The digital k-bit switch 30 shown in FIG. 4 consists of a first "AND-gate" group 36, a second "AND-gate" group 37 and an "OR-gate" group 38. Each of the three groups contains k gates, and each gate contains two inputs. The Q output of the second D-flip flop 29 (FIG. 2) is to be connected with the first input of all k gates of the second "AND-gate" group 37, and its $\overline{Q}$ output is to be connected with the first input of all k gates of the first "AND-gate" group 36. The output of each gate of the first "AND-gates" group 36 is connected to the first input of an associated OR-gate of the "OR-gate" group 38, and the output of each gate of the second "AND-gate" group 37 is connected to the second input of the associated OR-gate of the "OR-gate" group 38.

The following units of FIG. 2 are connected by means of a k-bit bus connection:

The k second inputs of the first "AND-gate" group 36 with the k-bit output of the threshold calculator 31, in this case.

The k second inputs of the second "AND-gate" group 37 with the k-bit threshold output 11 and the k-bit second input of the threshold calculator 31, in this case.

The k outputs of the "OR-gate" group 38 with the k-bit threshold input 9, in this case.

In FIG. 5a there is shown an ideal sequence of rectangular pulses 0-1-0-1, which exists as a transmitted signal s(t) at the output of the transmitter 1, if no modulator is present, and which generally consists of N bits, each having a bit duration $T_2$. The duration of the digital sequence is equal to $T_3 = N \cdot T_2$. In FIG. 5 N was chosen to be equal to 4.

In FIG. 5b there is shown for example a bell-shaped receive signal d(t), which is demodulated, if the transis larger than the associated threshold level p(t$_i$), stored in the cyclical memory or shift register 19. Otherwise there appears a logical "0". With the aid of the clock signal "clock 4", the aid of the inverter 20, and the AND-gate 21, the logical value "1" appears on the clock input of the m-bit counter 22 only during any gap in the sequence of impulses of the clock signal "clock 4". In the m-bit counter 22 these impulses are counted, and the digital m-bit counted value subsequently compared in the comparator 26 with the digital value M/2 stored in the m-bit memory 27. As soon as the count value exceeds the value M/2, there appears on the D-input of the D-flip flop 23 a logical "1", which is read, by the next positive edge of the clock signal "clock 2" fed from the clock input 7, into the D-flip flop 23. At the output of the D-flip flop 23, and consequently also at the signal output 10 of the distortion correction circuit 4 there appears therefore, although delayed by one bit, the ideal rectangular received signal f(t) corrected for any distortion. Following the impulse duration T$_2$ the negative edge of each impulse of the bit clock signal "clock 2" releases a short impulse of duration T$_4$ with the aid of the monostable multivibrator 24, which resets the m-bit counter 22, and if present, the n-bit counter 19a to zero, namely prior to the appearance of the next impulse at the clock input of the m-bit counter 22, as T$_2$+T$_4$<T$_1$−T$_3$.

If the threshold function p(t) is unknown and/or is variable from one impulse sequence to the next, the discrete threshold values or levels p(t$_i$) are unknown a priori, and must be continuously matched to the changing circumstances of the transmission channel 2. In such a case the circuit of the distortion correction circuit 4 must be supplemented by an add-on circuit 28.

At the commencement of the impulse sequence the positive edge of the clock signal "clock 3" switches the second D-flip flop 29 over to a logical "1", and therefore switches the switch 30 to the operating position. In a first mode the digital sequence to be received is therefore processed with the discrete threshold levels p(t$_i$) still stored in the first cyclical memory 19 from the last impulse sequence.

At the commencement of the impulse sequence the second memory 32 is reset to zero with the aid of the clock signal "clock 3". Both memories 19 and 32 are driven in parallel, and with each of the M discrete threshold levels p(t$_i$) there is stored in the corresponding cell of the memory 32 a digital h-bit count value. The count value applicable during processing has been stored in the last cell, namely in the right-most cell as shown in FIG. 2, of the second memory 32, and is incremented with the aid of the adder 33 by 1, if the processing at the output of the first comparator 16 results in a logical "1" value. For each of the M discrete threshold levels p(t$_i$) there is therefore obtained the actual frequency of occurrence of the number of logical "1" values in the sequence of impulses.

Based on the assumption that the frequency of occurrence of the number of logical "1" s actually present in the sequence of impulses is known, this value is stored as the "desired digital h-bit frequency-of-occurrence" in the h-bit memory 35. If this frequency-of-occurrence is, however, unknown, then the discrete threshold levels p(t$_i$) must first be determined approximately during a learning phase with the aid of a test sequence, which is known, or whose frequency of occurrence of logical "1" s is at least known. Subsequently the digital sequence is processed with these threshold values, the number of logical "1" s is determined, and this value stored as the desired "frequency-of-occurrence" in the h-bit memory 35.

The subtractor 34 forms for each of the M threshold levels p(t$_i$) the difference between the actual values and the desired values of the number of logical "1" s, and feeds this number as a digital h-bit value into the first input of the threshold calculator 31 by an h-bit bus serially. The threshold calculator 31 calculates continuously, with the aid of this difference value, and with the aid of the momentarily valid discrete threshold levels p(t$_i$) fed into the second input of the threshold calculator 31 from the threshold output 11, the new corrected threshold value.

The calculation is done in such a fashion that, as viewed over the entire duration T$_3$ of the impulse sequence, for each new threshold value there is separately obtained the same frequency of occurrence of logical "1" s, as for the bits of the original digital sequence.

All M corrected threshold values are, however, correct only at the end of the sequence, and are therefore shifted only at the end of the sequence, in a second phase, serially into the first cyclical memory 19 from the output of the threshold calculator 31 via the threshold input 9, with the aid of the switch 30, so that they are only available for the next sequence following the bit duration T$_2$, namely after M impulses of the scanning clock signal "clock 1" have occurred.

In order to achieve this object, the second D-flip flop 29 is again reset to zero at the end of the impulse sequence with the aid of the positive edge of the next impulse of the clock signal "clock 3", so that the switch 30 again returns to its reset position, and therefore connects the output of the threshold calculator 31 with the threshold input 9. If the digital switch 30 according to FIG. 4 is used, then at the start of the impulse sequence the logical "1" appearing on the Q-output of the second D-flip flop 29 releases the second "AND-gate" group 37, so that the digital k-bit threshold value appearing on the second input of the "AND-gate" group 37 reaches the output of the switch 30 via the "OR" group 38. Following conclusion of the impulse sequence the $\overline{Q}$-output of the second D-flip flop 29 releases the first "AND-gate" group 36, so that the corrected digital k-bit threshold value at the second input of the "AND-gate" group 36 reaches the output of the switch 30 via the "OR-gate" group 38. Only one of the two "AND-gate" groups 36 and 37 is released at a time.

A second possibility, namely to match the threshold levels p(t$_i$) to the state of the transmission channel 2, can be implemented, by storing all M.N. scanned values of the impulse sequence in an additional memory, and to calculate the M threshold levels p(t$_i$), following the end of the impulse sequence, with the aid of the scanned values and the threshold calculator 31, so that the "desired frequency of occurrence" of the logical "1" s for each of the M threshold levels is achieved as accurately as possible. With the so calculated threshold levels subsequently the M.N. scanned values are classified and processed.

A micro computer is preferably utilized to implement the threshold calculator 31.

The aforedescribed operation applies, based on the assumption of using serial electronic circuits. It is also possible to implement this operation with the aid of electronic circuits driven in parallel. This implementation is, however, more costly.

mitted signal s(t) is modulated and which appears at the input of the sample/hold circuit 15. The threshold function p(t) is also bell-shaped and shown dotted, assuming that the threshold value is variable within a bit duration, and that the threshold function is the same for all bits.

FIG. 5c shows a staircase function which consist per bit duration $T_2$ of M discrete sample values $d(t_i)$ of the demodulated received signal d(t), or of M discrete threshold values $p(t_i)$ of the threshold function p(t), also shown dotted. M represents an integral number of samples per bit duration $T_2$, wherein i=1,2, ... M.

FIG. 5d shows a rectangular scanning clock signal "clock 1" of a period $T_1$, and of an impulse duration $T_1$, where $T_1=T_2/M$. In FIG. 5d M=8 has been selected.

FIG. 5e shows a rectangular clock signal "clock 2" having a period $T_2$ and an impulse duration $T_2$.

FIG. 5f shows a rectangularly shaped clock signal having a period $T_3$ and an impulse duration $T_3$.

FIG. 5g shows the output signal k(t) of the second AND-gate 21.

FIG. 5h shows the received signal f(t) devoid of distortion at the output of a distortion correction circuit 4. The following applies:

$$T_1 > T_3 \geq T_2$$

Operation

Even if one assumes an ideal and rectangularly shaped transmitted signal in the transmitter ahead of the modulator, the received signal e(t) is, as a rule, considerably deformed at the signal input 5, due to distortions and various interfering signals n(t) arising in the transmission channel 2. A received signal e(t) is demodulated in the demodulator 14, if the transmitted signal s(t) is modulated, so that there appears at the input of the sample/hold circuit 15 the deformed demodulated received signal d(t), for example in the shape of a bell (FIG. 5b). This demodulated received signal is now compared to a threshold value, which, according to the present invention, is not constant, but is selected to be variable within a bit duration $T_2$. The threshold function can be assumed to be the same during the relatively short duration $T_3$ of the sequence of impulses for all bits of that sequence, and may, for example, be bell-shaped. The threshold function p(t) valid for the entire sequence of impulses is shown dotted in FIG. 5b.

Advantageously, prior to comparing the demodulated received signal d(t) with the aid of the sample/hold circuit 15 and the scanning clock signal "clock 1", the received signal is transformed into a staircase-shaped received signal, of a sequence of discrete sampled values $d(t_i)$ wherein i=1,2, ..., M and wherein M is an integer, and represents the number of samples per bit duration $T_2$, as shown in FIG. 5c. Consequently one also chooses a threshold function consisting of a plurality of discrete values, each step-shaped, as shown dotted in FIG. 5c, each representing a discrete threshold level $p(t_i)$ wherein i=1,2, ..., M. The M discrete threshold levels $p(t_i)$ per bit duration $T_2$ are stored in the M cells of the first cyclical memory 19. The comparator 16 compares the value $d(t_i)$ obtained at the output of the sample/hold circuit 15 with the associated stored discrete threshold values $p(t_i)$ stored in the last right cell of the cyclical memory 19, shown in FIG. 2.

During reception of the first bit of the impulse sequence, which provides the start impulse, all three clock signals are started synchronously with the impulse sequence. The generation of the synchronous clock signals, which are synchronous to one another, is accomplished by known methods of the digital technique, and is therefore not described, nor shown in FIG. 2, as it does not form any part of the claims. The scanning clock signal "clock 1" reaches the control input of the sample/hold circuit 15 from the clock input 6 through the AND-gate 18, so that the demodulated received signal d(t) during the impulse duration $T_1$ of the scanning clock signal "clock 1" is sampled, and subsequently the sampled value is held during the impulse gap of the scanning clock signal "clock 1", and passed to the output of the sample/hold circuit 15. The AND-gate 18 only serves to delay the first impulse of the scanning-clock signal "clock 1" with the aid of the inverter 25 by the value $T_3$, and thus permits the rectangularly shaped clock signal "clock 3" to reset at the beginning of the impulse sequence the D-flip flop 23 from the clock input 8 to zero, and if present, also the cyclical memory 32. Only following conclusion of the impulse duration $T_3$, does the clock signal "clock 3" which is zero for the remainder of the bit sequence, release the AND-gate 18 for the scanning clock signal "clock 1" via the inverter 25, so that its remainder—the first clock impulse shortened by the value $T_3$, and all following impulses—reach the output of the AND-gate 18. It is a condition for the correct operation that $T_1$ is greater than $T_3$. As the bit duration $T_2$ is equal to $M.T_1$, the demodulated received signal d(t) is scanned during the bit duration $T_2$ M times. The output signal of the AND-gate 18 is denoted in what follows as a fourth clock signal "clock 4".

The positive edges of the clock signal "clock 4" shift the M discrete threshold levels $p(t_i)$, as shown in FIG. 2, from left to right, and from cell to cell, through the cyclical memory 19 in such a manner that following a bit duration $T_2$ the same level is again stored in the same cell. In order to achieve this, the value stored in the last cell, namely the right cell as shown in FIG. 2, is shifted by means of the next positive edge of the clock signal "clock 4" via the threshold output 11 and the threshold input 9 into the first left cell of the cyclical memory 19. As the scanned values $d(t_i)$ are analog values, it is advantageous to use an analog shift register for the cyclical memory 19, and an analog comparator for the comparator 16. The scanned values $d(t_i)$ may, however, also be transformed with the aid of an analog-to-digital converter 17 into k-bit digital values, so that a digital comparator can be utilized as a comparator 16, and also a digital shift register, which contains a k-bit digital word per cell, can be utilized to implement the cyclical memory 19. If in the digital version, instead of a shift register, the circuit according to FIG. 3 is used, then n-bit counter 19a counts the impulses of the clock signal "clock 4" and the counted value serves as a digital n-bit address for the memory cell of the postcoupled random access memory, or of the postcoupled programmable read-only-memory 19b, in which the associated digital k-bit threshold value is stored. Here it is a condition that $M \leq 2^n$. The cyclical behavior of the memory 19 is not achieved here by feedback coupling of its output through the threshold output 11 and the threshold input 9, but by periodical reset impulses from the monostable multivibrator 24 at the end of each impulse of the bit clock signal "clock 2" passing to the reset input R of the n-bit counter 19a.

At the output of the comparator 16 there appears a logical value "1" if the instantaneous scanned value $d(t_i)$ I wish it to be understood that I do not desire to be limited to the exact details of construction shown and described, for obvious modification will occur to a person skilled in the art.

Having thus described the invention what I claim as new and desire to be secured by Letters Patent is as follows:

1. In a method of enhancing the probability of substantial error-free reception of a signal including a sequence of discrete bits with the aid of a time-variable threshold value, each bit having a predetermined duration, wherein said threshold value may change during said duration, wherein each received bit is composed of an integral number of discrete sampled levels during said bit duration, and wherein said threshold value includes an equal number of discrete threshold levels during said bit duration, the steps comprising comparing at least a selected one of the received bits during the duration of said bit a multiple number of times with said threshold value, assigning a discrete sampled bit level a logical "1" when its level exceeds the level of the corresponding discrete threshold value, assigning a discrete sampled bit level a logical "0", when its level falls below the corresponding discrete threshold value, and assigning a received bit a logical "1", if more than one-half of the discrete sampled bit levels have been assigned a logical "1", thereby establishing the probable validity of the received bits in dependence of the comparison results.

2. The method as claimed in claim 1, further comprising the step of using similar threshold values for each bit.

3. The method as claimed in claim 1, further comprising the step of using identical threshold values for each bit.

4. The method as claimed in claim 1, wherein a predetermined number of bits of said sequence have a logical "1" value, and further comprising the step of so choosing said threshold levels that the number of bits assigned said logical "1" equals as nearly as possible the number of bits having a logical "1" value in said sequence.

5. The method as claimed in claim 4, further comprising the steps of determining continuously the frequency of the number of received bits assigned said logical "1" value, following reception of said sequence of discrete bits, determining from the known or estimated number of bits in said sequence having a logical "1", the number of erroneous assignments to respective received bits of a logical "1", recomputing said threshold levels with a view of reducing said number of erroneous assignments in a next sequence, and storing the recomputed threshold levels.

6. The method as claimed in claim 5, further comprising the step of first approximately computing said threshold levels in a preliminary test sequence having a known number of logical "1"s, and only thereafter determining the number of bits assigned a logical "1" in said sequence having an unknown number of "1"s, with the aid of said approximately computed threshold levels.

7. The method as claimed in claim 5, where said recomputing is made with a microcomputer.

8. An apparatus for enhancing the probability of substantial error-free reception of a signal including a sequence of discrete bits, each having a predetermined duration, and wherein the received level of each discrete bit may change during said predetermined duration, comprising in combination sample/hold means for determining a multiple number of times a discrete level of a received bit during said bit duration, cyclical memory means for storing a multiple number of threshold levels, and a comparator for comparing said discrete bit levels with said threshold levels, respectively, so as to obtain a plurality of threshold values for each bit, whereby the probable value of the received bits in dependence of the comparison results can be determined.

9. An apparatus as defined in claim 8, wherein said memory means includes a counter and a programmable read-only memory.

10. An apparatus as claimed in claim 8, wherein said memory means includes a counter and a random access memory.

11. An apparatus as claimed in claim 8, wherein said memory means includes a plurality of digital shift registers.

12. An apparatus as claimed in claim 8, wherein said memory means includes an analog shift register.

13. An apparatus as claimed in claim 8, further comprising a counter for counting the number of logical "1"s during the bit duration, another comparator for comparing the counted number of logical "1"s with one half of said multiple number, and wherein said memory means includes a memory for digitally storing said one half of said multiple number, whereby a logical "1" may be assigned to a received bit, if more than half of the bit levels have been assigned a logical "1".

14. An apparatus as claimed in claim 8, further comprising an add-on circuit connected to said sample/hold means, said memory means, and said comparator, comprising in combination;

a switch for changing from a "receive" mode to a "threshold correction" mode, digital control means for controlling said switch, a threshold calculator connected to said switch for the determination of threshold values, other memory means for storing the number of actual "1"s in the sequence of received bits, second cyclical memory means for separately storing a number corresponding to the frequency of occurence of the number of logical "1"s determined for each threshold value, an adder for receiving said number corresponding to the occurrence of said logical "1"s, a subtractor connected to said adder for subtracting from said number corresponding to the frequency of occurrence of the number of said logical "1"s determined for each threshold value said number of "1"s in said sequence of received bits, and for obtaining a difference fed back to said threshold calculator, whereby continuously corrected threshold values are obtained.

15. An apparatus as claimed in claim 14, wherein said adder is counting said number of logical "1"s determined for each threshold value by incrementing by one the values stored in said second cyclical memory means each time when a logical "1" appears at the output of said comparator means.

16. The apparatus as claimed in claim 14, where said threshold calculator is a microcomputer.

17. In a method of enhancing the probability of substantial error-free reception of a signal including a sequence of discrete bits with the aid of a time-variable threshold value, each bit having a predetermined duration, wherein said threshold value may change during said duration, and wherein a predetermined number of bits of said sequence have a logical "1" value, wherein each received bit is composed of an integral number of discrete sampled levels during said bit duration, and wherein said threshold value includes an equal number of discrete threshold levels during said bit duration, the steps comprising comparing at least a selected of the received bits during the duration of said bit a multiple number of times with said threshold value, assigning a discrete sampled bit level a logical "1" when its level exceeds the level of the corresponding discrete threshold value, assigning a discrete sampled bit level a logical "0", when its level falls below the corresponding discrete threshold value, assigning a received bit a logical "1", if more than one-half of the discrete sampled bit levels have been assigned a logical "1" and so choosing said threshold levels that the number of bits assigned said logical "1" value equals as nearly as possible the number of predetermined bits having said logical "1" value in said sequence, and thereby establishing the probable validity of the received bits in dependence of the comparison results.

18. The method as claimed in claim 17, further comprising the steps of first approximately computing said threshold levels in a preliminary test sequence having a known number of logical "1"s, and only thereafter determining the number of bits assigned a logical "1" in said sequence having an unknown number of "1"s, with the aid of said approximately computed threshold levels.

* * * * *